United States Patent
Herdeg et al.

(10) Patent No.: US 6,696,186 B1
(45) Date of Patent: Feb. 24, 2004

(54) HUMIDIFYING DEVICE FOR A FUEL CELL, METHOD FOR HUMIDIFYING A FUEL CELL MEMBRANE AND FUEL CELL

(75) Inventors: Wolfgang Herdeg, Walddorfhäslach (DE); Holger Klos, München (DE); Martin Sattler, Königberg (DE); Sabine Hess, München (DE); Hans-Dieter Wilhelm, Nu-Anspach (DE); Jürgen Habrich, Hainburg (DE); Karl Eck, Frankfurt (DE); Markus Keutz, Rossdorf (DE); Thomas Zapp, Dortmund (DE)

(73) Assignees: Mannesmann AG, Düsseldorf (DE); Siemens AG, München (DE)

( * ) Notice: Subject to any disclaimer, the term of this patent is extended or adjusted under 35 U.S.C. 154(b) by 0 days.

(21) Appl. No.: 09/959,040

(22) PCT Filed: Apr. 19, 2000

(86) PCT No.: PCT/DE00/01298

§ 371 (c)(1),
(2), (4) Date: Nov. 27, 2001

(87) PCT Pub. No.: WO00/63982

PCT Pub. Date: Oct. 26, 2000

(30) Foreign Application Priority Data

Apr. 19, 1999 (DE) .......................................... 199 18 850

(51) Int. Cl.$^7$ ................................................. H01M 8/04
(52) U.S. Cl. ............................... 429/13; 429/22; 429/26
(58) Field of Search ................................. 429/13, 22, 26, 429/34

(56) References Cited

U.S. PATENT DOCUMENTS

| | | | | |
|---|---|---|---|---|
| 4,973,530 A | * | 11/1990 | Vanderborgh et al. | 429/13 |
| 5,360,679 A | * | 11/1994 | Buswell et al. | 429/19 |
| 5,432,020 A | * | 7/1995 | Fleck | 429/13 |
| 5,543,238 A | * | 8/1996 | Strasser | 429/17 |
| 6,274,259 B1 | * | 8/2001 | Grasso et al. | 429/13 |
| 6,416,895 B1 | * | 7/2002 | Voss et al. | 429/26 X |

FOREIGN PATENT DOCUMENTS

| | | | | |
|---|---|---|---|---|
| DE | 42 01 632 | * | 7/1993 | H01M/8/04 |
| JP | 6-132038 | * | 5/1994 | H01M/8/04 |

* cited by examiner

Primary Examiner—Stephen Kalafut
(74) Attorney, Agent, or Firm—Cohen, Pontani, Lieberman & Pavane

(57) ABSTRACT

The humidifying device for a fuel cell has a membrane, one side of which is exposed to cathode exhaust gas of a fuel cell for extracting water vapor from the exhaust gas. A connecting element connects the other side of the membrane to an anode or cathode gas supply to the fuel cell. In operation, water vapor permeates through the membrane and passes on through the connecting elements to humidify the gas being supplied to the fuel cell. A vacuum pump may additionally be provided to enhance the extraction of water vapor from the exhaust gas. A no metering unit allows accurate metering of the humidity of the cathode or anode gas supply.

9 Claims, 3 Drawing Sheets

HUMIDIFYING DEVICE FOR A FUEL CELL, METHOD FOR HUMIDIFYING A FUEL CELL MEMBRANE AND FUEL CELL

PRIORITY CLAIM

This is a U.S. national stage of application No. PCT/DE00/01298, filed on Apr. 19, 2000. Priority is claimed on that application and on the following application: Country: Germany, Application No.: 199 18 850.5, Filed: Apr. 19, 1999.

BACKGROUND OF THE INVENTION

1. Field of the Invention

The present invention relates to a humidifying device for fuel cells, to a method for humidifying a fuel cell membrane, and to a fuel cell.

2. Description of the Related Art

Current is generated in a fuel cell by a chemical reaction. In the process, fuel and oxygen are converted into electrical energy and water as the reaction product. A fuel cell or PEM fuel cell substantially comprises an anode, a membrane and a cathode, which together are known as the membrane electrode assembly or MEA. The membrane consists of porous, electrically conductive material and is arranged between the anode and the cathode in order to exchange ions. A fuel, such as for example hydrogen or methanol, is supplied on the side of the anode, while oxygen or air is supplied on the side of the cathode. Protons or hydrogen ions are generated by catalytic reactions at the anode, and move through the membrane to the cathode. At the cathode, the hydrogen ions react with the oxygen, and water is formed.

The reaction at the electrodes is as follows:

Anode: 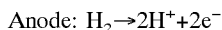

Cathode: 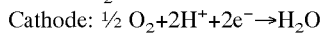

Thereby, current is generated at the electrodes and is fed to a consumer.

Fuel cells of this type are known from a wide range of publications. However, the problem exists that the membrane or the MEA has to be kept moist.

If the membrane were to dry out, it would lose its ion conductivity and the fuel cell would no longer be able to function.

Therefore, it is proposed in U.S. Pat. No. 5,432,020 to add finely atomized water to the gas flow to the fuel cell by means of an injection nozzle. As a result, the membrane is cooled and kept moist.

However, with this arrangement the problem exists that it is necessary to carry along a supply of water. The supply of water takes up space and requires further measures, such as for example protection against freezing, which entails additional costs. Therefore, a need exists for a fuel cell having a membrane that remains moist without having the above noted associated problems.

Therefore, the object of the present invention is to provide a humidifying device for fuel cells and to describe a method for humidifying a fuel cell membrane, in which effective humidifying of the fuel cell membrane takes place inexpensively and in a space-saving manner. Furthermore, it is intended to provide a fuel cell which is inexpensive and the membrane of which is reliably kept moist.

This object is achieved by the humidifying device for a fuel cell as claimed in patent claim 1, the method for humidifying a fuel cell membrane as claimed in patent claim 6 and by the fuel cell as claimed in patent claim 12. Further advantageous features, aspects and details of the invention will emerge from the dependent claims, the description and the drawing.

The humidifying device according to the invention for a fuel cell comprises a membrane, which is coupled to the cathode exhaust gas of a fuel cell, the cathode exhaust gas being situated on one side of the membrane, and a connecting element which acts as a line connecting the other side of the membrane to the cathode or anode gas supply, so that in operation water vapor penetrates through the membrane, in order to humidify the gas, for example outside air or oxygen, which is fed to the anode or cathode. The humidifying device allows reliable humidifying of the membrane electrode unit of a fuel cell and can be produced in compact form and at low cost. It is therefore particularly suitable for series production.

The humidifying device advantageously comprises a vacuum pump for maintaining a concentration gradient of the humidity between the two sides of the membrane. This results in particularly effective exchange of the humidity through the membrane.

Furthermore, it is possible to provide a vessel which is used to receive and/or temporarily store water vapor or water.

It is preferable to provide a metering unit to humidify the gas flow which is passed to the cathode. This allows metering with the quantity of water required in each case as a function of the operating state of the fuel cell to take place.

The metering unit is advantageously connected to a control circuit in which the humidity of the cathode feed air or the humidity of the gas which is guided to the cathode is measured. This allows particularly precise metering to take place.

SUMMARY OF THE INVENTION

In the method according to the invention for humidifying a fuel cell membrane, the cathode exhaust gas of a fuel cell is connected, via a membrane, to an anode or cathode gas supply, for example outside air or oxygen, in order, by means of a concentration gradient of the humidity on the two sides of the membrane, for water vapor to be transferred from the cathode exhaust gas to the gas or cathode gas supply. Using the permeation of water molecules through the membrane allows water vapor to be transported without an external drive or without the additional use of energy and without the cathode exhaust gas being mixed with the gas supplied to the fuel cell.

The passage of water vapor through the membrane is preferably assisted by actuation of a vacuum pump. Generation of a vacuum allows the concentration gradient to be maintained. The result is a particularly high and uniform transfer rate for the water vapor.

The concentration gradient can also be maintained by constantly exchanging gas on one side of the membrane. This has the advantage that no pump is required. This solution is particularly inexpensive since components are saved and the outlay on energy in operation is reduced.

Preferably, humidity is temporarily stored in a vessel or water tank and can then be transferred in an accurately metered manner to the cathode gas supply.

A fuel cell according to the invention has a humidifying device according to the invention.

BRIEF DESCRIPTION OF THE DRAWINGS

The present invention is described below by way of example. In the drawing.

DESCRIPTION OF THE PREFERRED EMBODIMENT

Figure 1:
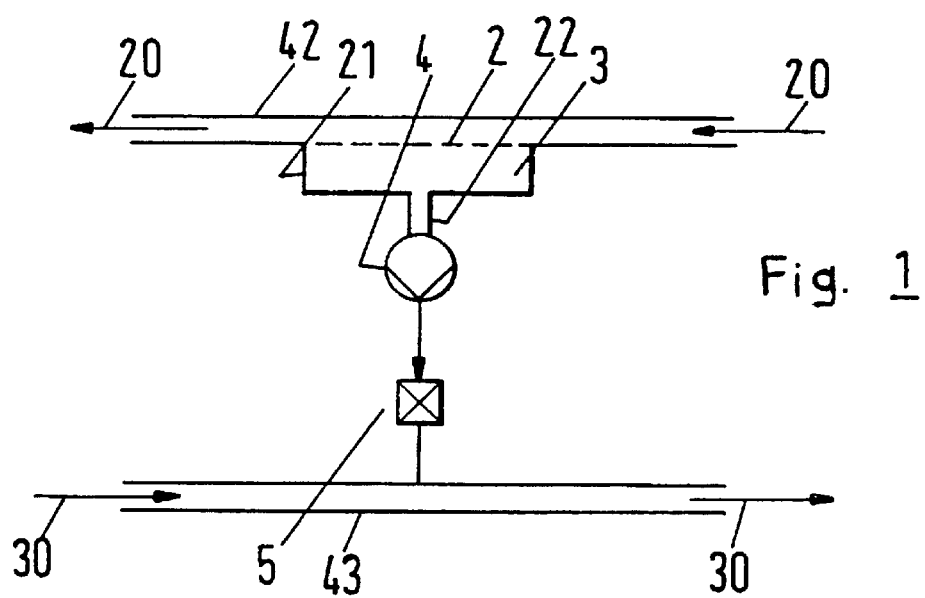
FIG. 1 diagrammatically depicts one embodiment of the invention.

FIG. 1 shows a humidifying device 1 according to the invention which is arranged between the cathode exhaust air 20 from a fuel cell and the cathode feed air 30 to the fuel cell. The fuel cell: is not shown in this figure. A membrane 2 which is permeable to moisture is secured in a housing 21 and is arranged in such a way that the cathode exhaust air 20 is guided past one side of the membrane 2. On the opposite side of the, membrane 2 there is a chamber 3 which is delimited by the membrane 2 and the housing 21. A connection 22 in the form of a gas line which connects the chamber 3 to the cathode feed air 30 via a vacuum pump 4 and a metering unit 5 branches off from the chamber 3.

When the fuel cell is operating, the reaction product water is contained in the cathode exhaust air. Therefore, the cathode exhaust air 20 is warm and humid. The direction of flow of the cathode exhaust air 20 and of the cathode feed air 30 is in each case indicated in FIG. 1 by the direction of the arrows. The cathode feed air 30 or the outside air which is used as cathode feed air is therefore very much drier than the cathode exhaust air 20. Consequently, there is a concentration gradient of the humidity between the two sides of the membrane 2. On account of permeation, the water vapor penetrates through the membrane 2 when the fuel cell is in operation and is thereby carried from the cathode exhaust air 20 through the line 22 to the cathode feed air 30.

The concentration gradient is maintained by the vacuum pump 4, so that the water vapor can be transported continuously.

By means of the metering unit 5, the water vapor which has been removed from the cathode exhaust air 20 through the membrane 2 is accurately metered, i.e. is fed to the cathode feed air 30 in the quantity which is required as a function of the particular operating state of the fuel cell. For this purpose, the metering unit 5 is connected to a control circuit, which is not shown in this figure, measures the humidity of the cathode feed air and adjusts the quantity of water required accordingly.

In a further embodiment, a gas exchange device, which constantly exchanges the air in the chamber 3 in order to maintain the necessary concentration gradient which drives the exchange of water vapor, is provided instead of the vacuum pump 4. For this purpose, a line for supplying cathode gas leads into the chamber 3 and, from there, onward to the fuel cell. Therefore, in operation the exchange of air or oxygen in the chamber 3 maintains a concentration gradient between the two sides of the membrane 2. In a further embodiment of the invention, the membrane 2 is a part of the wall of the cathode exhaust-air or exhaust-gas line and a part of the wall of the cathode gas supply line, so that the cathode exhaust air 20 flows past one side of the membrane 2 and the cathode feed air 30 flows past the other side of the membrane 2. This solution is particularly space-saving and inexpensive.

In the particularly preferred embodiment shown in the figure, the membrane housing 21 is formed integrally with a cathode exhaust-air line 42. The cathode exhaust-air line 42 and a section of a cathode feed-air line 43 are provided for the purpose of fitting the humidifying device 1 into the corresponding associated lines of the fuel cell. This makes it easy to connect the humidifying device 1 to the fuel cell with little expenditure.

An additional vessel for temporarily storing the water or water vapor which has been removed is not shown in the figure. The vessel or water tank offers the advantage that there is always a reserve for humidification of the cathode feed air 30. The humidity which has been removed from the humid air flow or the cathode exhaust air 20 is collected in the water tank and is fed to the cathode feed air 30 as required.

In general terms, the humidifying device 1 is suitable for removing water vapor or humidity from the cathode exhaust gas or the cathode exhaust air and for transferring the humidity of the water to the gas or to the outside air which is fed to the cathode of the fuel cell. The invention has the advantage that dehumidification takes place without a condensation loop, i.e. there is no need to cool and/or heat the cathode air in order to reach the condensation point. This saves energy.

Furthermore, the design of the humidifying device 1 is simple and therefore relatively unsusceptible to faults. The use of a dehumidifying membrane, as is known from many applications, to exchange, the water vapor or the humidity between the cathode exhaust air 20 and the cathode feed air 30 offers reliable humidification of the membrane electrode assembly of the fuel cell which is inexpensive and not complex.

Figure 2:
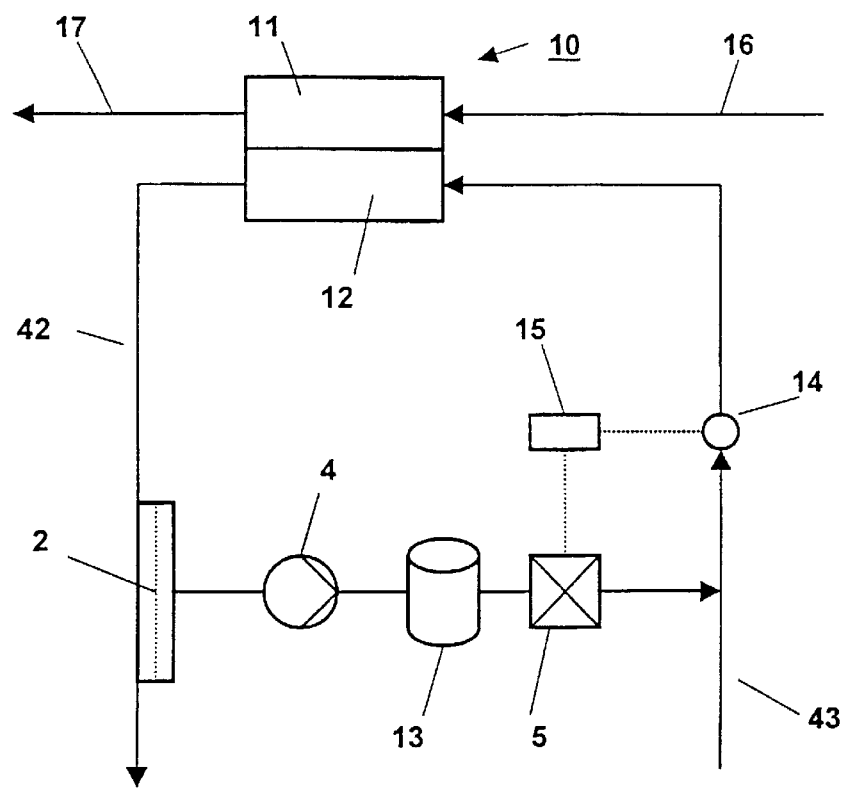
FIG. 2 diagrammatically depicts a second embodiment.

FIG. 2 diagrammatically depicts a fuel cell 10, having an anode part 11 land a cathode part 12, which are connected to a humidifying device according to the invention. Gaseous fuel (e.g. pure hydrogen as anode gas) is fed to the anode part 11 through the anode feed line 16. The anode exhaust gas leaves the anode part 11 through the anode gas discharge line 17. The membrane 2 of the humidifying device is connected to the cathode gas discharge line 42, specifically in the same way as in FIG. 1. In this case too, a vacuum pump 4 and a metering unit 5 are provided. In addition, a vessel 13 is incorporated in the line from the vacuum pump 4 to the metering unit 5 and serves to store water and/or water vapor. The metering unit 5 adds water/vapor to the cathode gas (fresh air) in order to humidify the cathode gas which flows through the cathode feed-air line 43 into the cathode part 12. Water/vapor is recovered from the cathode exhaust gas through the membranes 2 and the vacuum pump 4. A humidity sensor 14 is incorporated in the cathode feed-air line 43, downstream of the humidification point as seen in the direction of flow, in order to determine the current humidity of the cathode gas. The humidity sensor is electrically connected to the control unit 15, which influences the metering unit 5 in such a manner that the humidity of the cathode gas remains at a predetermined level.

Figure 3:
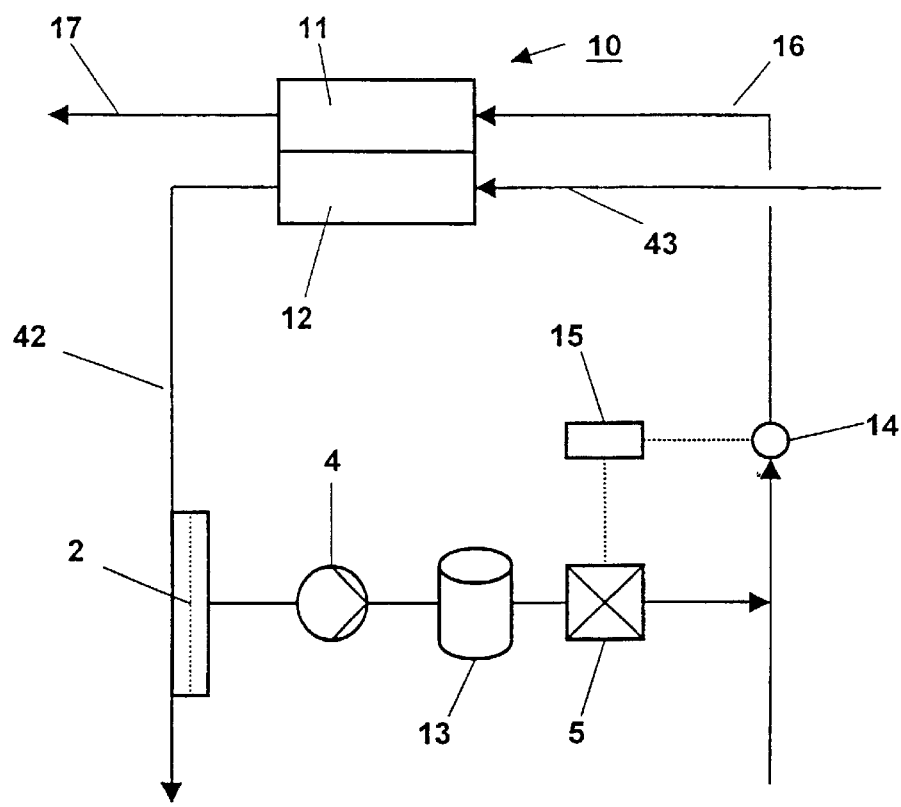
FIG. 3 diagrammatically depicts a third embodiment of the invention.

FIG. 3 shows another embodiment of the invention which however, is very similar to that shown in FIG. 2. The only difference is that the metering unit 5 and the humidity sensor 14 are incorporated in the anode gas feed line 16 instead of in the cathode feed air line 43.

It will be appreciated that those skilled in the art will be able to devise numerous arrangements which, although not explicitly shown or described herein, embody the principles of the invention. Accordingly, all such alternative, modifications and variations which fall within the spirit and broad scope of the appended claims will be embraced by the principles of the invention.

What is claimed is:

1. A humidifying device for a fuel cell, having a semi-permeable membrane (2), which is coupled to the cathode exhaust gas (20) of a fuel cell, the cathode exhaust gas (20) being situated on one side of the membrane (2), characterized by a connecting element (22) which firstly has a gas line and acts as a line connecting the other side of the membrane (2) to the anode or cathode gas supply (30) to the fuel cell, so that in operation water vapor penetrates through the membrane (2) in order to humidify the gas which is guided to the fuel cell, said connecting element further comprising means for regulating the water vapor fed to the gas which is guided to the fuel cell.

2. The humidifying device as claim in claim 1, characterized in that the means for regulating includes a metering unit (5) connected to a control circuit.

3. A humidifying device for a fuel cell, having a semipermeable membrane (2), which is coupled to the cathode exhaust gas (20) of a fuel cell, the cathode exhaust gas (20) being situated on one side of the membrane (2), and a connecting element (22) which firstly has a gas line and acts as a line connecting the other side of the membrane (2) to the anode or cathode gas supply (30) to the fuel cell, so that in operation water vapor penetrates through the membrane (2) in order to humidify the gas which is guided to the fuel cell, characterized in that the connecting element (22) has a vacuum pump (4) for maintaining a concentration gradient of the humidity between the two sides of the membrane (2).

4. The humidifying device as claimed in claim 3, characterized in that the means for regulating includes a metering unit (5) connected to a control circuit.

5. A method for humidifying a fuel cell membrane, in which cathode exhaust gas (20) from the fuel cell and containing a humidity is guided past one side of a humidifying membrane (2) and water vapor, by means of a concentration gradient of the humidity, passes to the other side of the humidifying membrane (2), and the water vapor is transferred to a gas which is guided to the fuel cell, characterized by transferring the water vapor from the other side of the humidifying membrane (2), via a connecting element (22) which has a gas line and a metering unit (5), to the anode or cathode gas supply (30).

6. The method as claimed in claim 5, characterized in that the passage of water vapor through the humidifying membrane (2) is assisted by actuation of a vacuum pump (4).

7. The method as claimed in claim 6, characterized in that the concentration gradient is maintained by a vacuum pump (4).

8. The method as claimed in claim 7, characterized in that that concentration gradient is maintainied by the exchange of gas.

9. The method as claimed in claim 8, characterized in that the humidity is temporarily stored in a vessel.

* * * * *